US011863568B2

(12) United States Patent
Sapountzis et al.

(10) Patent No.: US 11,863,568 B2
(45) Date of Patent: Jan. 2, 2024

(54) SUSCEPTIBILITY-BASED WARNING TECHNIQUES

(71) Applicant: Cisco Technology, Inc., San Jose, CA (US)

(72) Inventors: Nikolaos Sapountzis, San Francisco, CA (US); Fabio R. Maino, Palo Alto, CA (US); Madhuri Kolli, San Jose, CA (US); Daniela Alvim Seabra De Oliveira, Gainesville, FL (US)

(73) Assignees: Cisco Technology, Inc., San Jose, CA (US); University of Florida Research Foundation, Inc., Gainesville, FL (US)

( * ) Notice: Subject to any disclaimer, the term of this patent is extended or adjusted under 35 U.S.C. 154(b) by 117 days.

(21) Appl. No.: 17/208,366

(22) Filed: Mar. 22, 2021

(65) Prior Publication Data

US 2022/0303285 A1    Sep. 22, 2022

(51) Int. Cl.
| | |
|---|---|
| *G06F 15/173* | (2006.01) |
| *H04L 9/40* | (2022.01) |
| *G06F 40/30* | (2020.01) |
| *H04L 67/306* | (2022.01) |

(52) U.S. Cl.
CPC ......... *H04L 63/1416* (2013.01); *G06F 40/30* (2020.01); *H04L 63/1433* (2013.01); *H04L 63/1483* (2013.01); *H04L 67/306* (2013.01)

(58) Field of Classification Search
CPC ............. H04L 63/1416; H04L 63/1433; H04L 63/1483; H04L 67/306; G06F 40/30

USPC ................................... 726/24; 709/206, 224
See application file for complete search history.

(56) References Cited

U.S. PATENT DOCUMENTS

| | | | |
|---|---|---|---|
| 9,674,210 B1 * | 6/2017 | Oprea ................. | H04L 63/1433 |
| 10,970,188 B1 * | 4/2021 | Åvist .................. | G06F 11/3438 |
| 11,190,470 B2 * | 11/2021 | Cox ..................... | H04L 51/52 |
| 11,233,821 B2 * | 1/2022 | Yadav ................... | H04L 63/102 |
| 2016/0344770 A1 | 11/2016 | Verma et al. | |
| 2019/0028510 A1 | 1/2019 | Celik | |
| 2020/0021620 A1 | 1/2020 | Purathepparambil et al. | |
| 2020/0084228 A1 | 3/2020 | Goutal | |
| 2020/0175115 A1 * | 6/2020 | Pandit ................. | G06K 9/6268 |
| 2020/0234109 A1 * | 7/2020 | Lee ......................... | G06N 3/08 |
| 2020/0252803 A1 * | 8/2020 | Shah .................... | G06N 20/20 |
| 2020/0287917 A1 | 9/2020 | Sites et al. | |
| 2020/0372172 A1 * | 11/2020 | Murray ................ | G06F 16/958 |
| 2021/0075824 A1 * | 3/2021 | Ibrahim .................. | G06N 5/02 |

* cited by examiner

*Primary Examiner* — Liang Che A Wang
(74) *Attorney, Agent, or Firm* — Lee & Hayes, P.C.

(57) ABSTRACT

In one embodiment, a method comprises training at least one model based at least in part on interactions between one or more users and electronic messages sent to addresses associated with the one or more users, receiving a first electronic message sent to a first address associated with a first user, analyzing the first electronic message to generate first feature data, determining one or more characteristics of the first user to generate second feature data, inputting, to the at least one model, the first feature data and the second feature data, and receiving, as output of the at least one model, data indicating whether to output, to the first user, a warning regarding the first electronic message.

20 Claims, 6 Drawing Sheets

SUSCEPTIBILITY-BASED WARNING TECHNIQUES

TECHNICAL FIELD

The present disclosure relates generally to techniques for determining when to output cyber-attack warnings to users in a personalized manner to avoid user habituation of outputted warnings.

BACKGROUND

Phishing is a dangerous, albeit conceptually simple, type of cyber-social engineering attack, characterized by the sending of malicious direct messages procuring personal information or attempting to install malware in user devices by convincing users to click on malicious links embedded in the messages. Despite its simplicity, phishing can exert considerable harm on users, corporations, and even national security. There are many proposed countermeasures to phishing ranging from automatic filtering using machine learning and URL blocklists to human detection via user education and automatic warnings. Given that phishing techniques are constantly evolving and messages change often, automatic-filtering techniques face many challenges because the learning models and blocklists become outdated fast. Thus, offering warnings to users regarding potential phishing attacks is a key component of the anti-phishing defense arsenal. Unfortunately, many users become habituated to frequency security warnings, thus lessening the efficacy of these warnings over time.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes, in part, one or more computing devices comprising one or more processors and one or more computer-readable media storing computer-executable instructions that, when executed, cause the one or more processors to perform one or more acts. The acts may include training at least one model based at least in part on interactions between one or more users and electronic messages sent to addresses associated with the one or more users. In addition, the acts may include receiving a first electronic message sent to a first address associated with a first user, performing natural-language-processing (NLP) on the first electronic message to identify text of the first electronic message, and generating first feature data based at least in part on the text of the first electronic message. The acts may further include generating second feature data based at least in part on one or more characteristics of the first user, inputting, to the at least one model, the first feature data and the second feature data, and receiving, as output of the at least one model, data indicating whether to output, to the first user, a warning regarding the first electronic message.

The disclosure also describes, in part, a method comprising training at least one model based at least in part on interactions between one or more users and electronic messages sent to addresses associated with the one or more users, receiving a first electronic message sent to a first address associated with a first user, analyzing the first electronic message to generate first feature data, determining one or more characteristics of the first user to generate second feature data, inputting, to the at least one model, the first feature data and the second feature data, and receiving, as output of the at least one model, data indicating whether to output, to the first user, a warning regarding the first electronic message.

Additionally, it is noted that each the techniques described herein may be performed via methods, device(s), and/or non-transitory computer-readable media storing computer-executable instructions that, when executed by one or more processors, performs methods described herein.

Example Embodiments

This disclosure describes, in part, techniques for determining when to output, to a user, security warnings based on individual susceptibilities of the user, or common susceptibilities of users that share characteristic(s) with the user, to avoid habituation and desensitization of these types of warnings. In some instances, the techniques involve training a local model for the example user based on behavior of the user, as well as training global models for users that share certain demographic or other characteristics, such as socioemotional characteristics. Thereafter, upon the example user receiving an incoming message, the techniques may analyze the message itself to generate first feature data indicative of whether the message includes one or more deceptive queues. In addition, the techniques may generate second feature data based on one or more characteristics of the user, such as a current social-emotional state of the user, which may be determined by a questionnaire, survey, user interactions on the user computing device, or the like.

The techniques may then input, to the local model trained for the user, the first and second feature data. The local model may output first data (e.g., a first score) indicative of whether a warning should be output to the user. That is, the first data may be indicative of whether the message is potentially deceptive and/or whether the user may be susceptible to this particular message. In addition, the techniques may determine one or more of the global models to associate with the user, such as a global model associated with a group to which the user belongs, with the group based on demographic data, social-emotional data, and/or the like. The techniques may then input the first and second feature data into the global model associated with the user, which may output second data indicative of whether the message includes one or more deceptive cues and/or whether users of this particular demographic may be susceptible to this particular message.

The techniques may then determine whether to output a security warning to the user based on the first and second data. For instance, the techniques may generate third data based on the first and second data. To provide an example, in instances where first and second data comprise first and second scores, respectively, the techniques may generate a third score that is based on the first and second scores. The third score may comprise a mean of the first and second scores, a harmonic mean of the first and second scores, a weighted mean based on the first and second scores, a maximum of the first and second scores, a minimum of the first and second scores, and/or the like.

After generating the third data, the techniques may determine whether the third data meets one or more specified criteria, such as whether the third score is greater than a predefined threshold. If so, then the techniques may output a warning to the user. If not, then the techniques may refrain from outputting a warning. In some instances, the predefined threshold may be configured by the user, such that the user can select how aggressive the user would like to be in terms of receiving warnings or not. That is, the user may indicate that the user would rather err on the side of caution and receive more warnings rather than fewer, or vice versa. In addition, or in the alternative, the predefined threshold may be selected based on one or more characteristics of the user, such as demographic characteristics, socio-emotional characteristics, or the like. In still other instances, or in addition, the predefined threshold may vary dynamically based on time (e.g., a threshold may be lower in the evening or night), based on varying states of the user, and/or so forth.

By selectively outputting these warnings based on particular susceptibilities of the example user, and based on whether an incoming message corresponds to these susceptibilities, the techniques lessen the chances for the user (and other users) to become desensitized to these types of warnings. Stated otherwise, the users may be more likely to heed the outputted warnings than if the warnings were outputted at a much greater rate. Further, it is to be appreciated that while the examples described herein describe inputting the features data into two models and generate the third data based on outputs of the two models, in other instances the techniques may use one model (e.g., just the local model or just the global model) or may use more than two models. Further, the warning output to the user may comprise a visual warning (e.g., a user-interface element), an audible warning (e.g., a noise or computer-generated speech), and/or any other type of warning. Finally, while the techniques are described with reference to incoming communications, the techniques may apply equally to any other types of files, data, and/or the like that may represent malicious behavior.

Turning to the example of phishing, it is to be appreciated that research on user susceptibility to phishing has indicated that susceptibility varies as a function of user demographics (e.g., age and gender), cognitive and socioemotional functioning, and deceptive cues used in a received message. Thus, the described techniques describe personalization of phishing warnings for email messages to enhance human detection. As noted above, personalized warnings may be generated less frequently, thus requiring less cognitive load from users and improving warning relevance, potentially ameliorating habituation while improving comprehension and adherence. The techniques described that effective phishing warnings may provide users with a susceptibility score that indicates, in a user-friendly manner, how susceptible the user is to a suspicious email. Thus, the techniques may predict user susceptibility on potential phishing emails and indicate how and when efficient warnings should be generated.

For instance, the techniques described herein integrate and consider various features that come from two heterogeneous sources. One source is the user's characteristics, with features represented by user's interindividual differences (e.g., age), while another source of features comes from the email message and is represented by the deceptive cues attackers apply in the message to make it more appealing to users (e.g., principle of persuasion). In some instances, the techniques may train two susceptibility models, through an empirically driven (e.g., anonymized) training dataset with such features (e.g., principle of persuasion in email, age, etc.). Further, for a particular user, the techniques may generate a group function which represents the susceptibility model of users with similar characteristics to the current user (e.g., users with similar demographics that might have similar susceptibility profiles), and a personalized function which considers the susceptibility model of that current user only. In some instances, functionality of the techniques may improve when a large number of features are used from each source to improve accuracy without jeopardizing performance.

Upon the receipt of a new message, the two functions may be fed with the corresponding inputs (e.g., what type of principle of persuasion this incoming email leverages) and may output two susceptibility scores that are "averaged out" to an integrated susceptibility score (ISS). If the ISS crosses a configurable threshold, a warning may be raised, thus potentially ameliorating habituation. The techniques may perform the prediction and warning model in real-time in some instances.

As noted above, the input parameters (also described as features or predictors) may come from two categories. The first are attacker-centric predictors, which refer to e-mail features, such as the use of principles of persuasion or pretext in emails. The second are victim-centric predictors, which refer to a user's characteristics, such as gender, age, cognitive status, susceptibility behavior, and the like.

Attacker-centric predictors refer to deceptive cues attackers often apply in phishing messages to increase their appeal. These cues may include principle of persuasion, pretext (or self-reference), emotional salience, and gain/loss framing. Principles of persuasion comprise authority, reciprocation, social proof, consistency, liking, and scarcity. For example, people tend to comply with requests coming from perceived figures of authority. These values may be defined as $X_a$, $X_c$, $X_l$, $X_p$, $X_r$, $X_s$, and $X_{sp}$, with the binary variables indicating whether an incoming email leverages these principles (e.g., $X_a=1$ means that the email leverages authority). Pretext, meanwhile, refers to the context or life domain of a message, and influences the personal relevance of the message to a specific user. Examples include financial, health, ideological (i.e., ideas, beliefs, principles), legal, security (e.g., physical and online safety), and social (e.g., interactions). The following binary variables indicate whether the email uses these life domains: $X_f$, $X_h$, $X_i$, $X_{le}$, $X_{se}$, and $X_{so}$. Emotional salience may refer to positive or negative stimuli in a message's context and may contribute to a user's susceptibility to phishing. For example, a malicious message with a cover story to invite the user to sign a petition against animal abuse, highlighting the suffering of the abused animals, might be particularly appealing to users because the message may invoke negative emotions. The binary variable $X_{es}$ denotes the use of emotional salience in the message, positive or negative. Gain/loss framing refers to the framing of the acting on a message (e.g., clicking on link or opening an attachment) as either leading to a gain (e.g., a link to an online coupon) or to the prevention of a loss (e.g., preventing an email account from being suspended). The binary variable $X_{glf}$ denotes the framing as gain or loss. Thus, given the above, the techniques may define the set of attacker-centric features as X, where X equals the union of ($X_a$, $X_c$, $X_l$, $X_p$, $X_r$, $X_s$, and $X_{sp}$), ($X_f$, $X_h$, $X_i$, $X_{le}$, $X_{se}$, and $X_{so}$), $X_{es}$, and $X_{glf}$.

Victim-centric predictors, meanwhile, represent user characteristics that contribute to phishing susceptibility. The techniques described herein may use some or all of the example characteristics to determine these predictors: demographics (age, gender, income, educational level) and cognitive and socioemotional functioning. In some instances, susceptibility may increase with age, may be negatively associated with income and educational level, and may vary based on gender or other user characteristics. The techniques may adopt four variables for user demographics. For instance, $Y_{age}$, $Y_{gen}$, $Y_{inc}$, and $Y_{edu}$ may respectively denote the age, gender, income, and education level. Gender (e.g., male vs. female) may represent a binary variable and educational level (e.g., none, high school, associate, bachelor, master, PhD) may be categorical. Although age and income are continuous, the techniques may discretize this factor to decrease model complexity. The techniques may discretize this factor in any manner, such as binary (e.g., 0 for young, and 1 for older) multiple values (e.g., teenagers, adults, older adults), or the like.

For cognitive status, the techniques consider some or all of the example following measures: backwards counting, backward digit span, category fluency, delayed and immediate word list recall, and number series from the Brief Test of Adult Cognition by Telephone (BTACT), which measures cognitive function in areas affected by aging. The techniques may denote these continuous variables as $Y_{bc}$, $Y_{bsp}$, $Y_{cf}$, $Y_{dwlr}$, $Y_{iwlr}$, and $Y_{ns}$ for category fluency, word list recall, and number series (e.g., the total score is the total number of correct responses). For backward counting, the total score is calculated as 100 (e.g., number reached+number of errors), with higher scores indicating better cognitive function. For socio-emotional functioning, the techniques may utilize factors such as the Positive and Negative Affect Scale (PANAS), the trait scores of the Stait-Trait Anxiety Inventory (STAI) Trait and State, and the Interpersonal Trust Scale (ITS) for trust. The techniques may denote them as $Y_{pos}$, $Y_{neg}$, $Y_{ss}$, $Y_{st}$, $Y_{trust}$. The PANAS may asses, on a 5-point Likert scale (e.g., 1=Very slightly or not at all, 5=Extremely) the user's present positive and negative affect or mood. Higher scores in the positive subscale indicate higher positive affect and higher scores in the negative subscale indicate higher negative affect. The STAI, meanwhile, may comprise a state ("at the moment") and a trait ("in general"), and in some instances the techniques utilize the state anxiety measure. The response scale may use a 4-point Likert scale (e.g., 1=Not at all, 4=Very much), with higher scores indicating greater anxiety. Finally, the ITS may utilize 5-point scale (e.g., 1=Strongly disagree, 5=Strongly agree) as a measure of interpersonal trust, with lower scores corresponding to higher trust. It is to be appreciated that this information may be aggregated via surveys, questionnaires, quizzes, analysis of user behavior on a computer (e.g., typing speed, cursor speed, etc.), analysis of a face of a user from video captured from a video camera of the user's computing device (e.g., to determine if the user is happy or sad), and/or the like. Thus, given the above, the techniques may define the set of victim-centric features as Y, where Y equals the union of one or more of the Y variables described above.

Given the above, the techniques provide a predictive, on-the-fly warning system that personalizes these warnings based on individual users and received messages. In some instances, given a training dataset on susceptibility measures, the techniques may first derive the models for group and personal susceptibility functions. In some instances, these techniques perform this step offline. Next, upon receiving a message, the techniques may analyze (e.g., scan) the message for the presence of attacker-centric features, such as those described above. Further, victim-centric features can be inputted into the functions, with this information being determined from electronic questionnaires, other assessment instruments, or the like. Both of these sets of features may then be input into the global and local susceptibility functions, each of which may derive and output a different susceptibility score. The techniques may then integrate these scores into an integrated susceptibility score (ISS) and, finally, may output a warning if the IS S is greater than a configurable threshold.

In more detail, the first step may include training or deriving two susceptibility models. First, the techniques may derive a generic model that fits both susceptibility functions. Note that while the following example uses a regression learning model, other learning models may be used in other instances (e.g., Random Forest, etc.). To begin, the domain space of the union of the attacker- and victim-centric features sets may be defined as D and as R the set of real numbers. If the sum of all features is $\|X\|+\|Y\|=N$, then $D \supseteq RN$, and a susceptibility function can be modeled as the following:

$$S(X,Y):D \to [0,1] \qquad \text{(Equation 1)}$$

In this example, a susceptibility score is an instant of this susceptibility function under a certain set of values for X,Y. Next, the techniques may derive two susceptibility functions using Equation 1 by leveraging the attacker- and victim-centered features from two different viewpoints. For instance, the techniques may derive the group (or global) susceptibility score and the personal (or local) susceptibility score.

The techniques may generate the group susceptibility function as a logistic regression function of the attacker- and victim-centric features. A logistic regression model establishes a relationship between an outcome variable (e.g., susceptibility) that follows the Bernoulli process and a group of features, namely the predictor variables (e.g., attacker- and victim-centric predictors). The logistic regression may model the logit-transformation of the susceptibility function as a linear relationship of the predictor variables. The logit of a variable p, also called the log-odds of p (p usually being a probability), is the logarithm of the odds p/(1−p), as shown below:

$$\text{logit}(p) = \log(p/(1-p)) \quad \text{(Equation 2)}$$

Next, the group susceptibility function may be modeled based on the lemma that the logit transformation of the group susceptibility function is the following:

$$\text{logit}(S^{GR}(X,Y)) = \Sigma_{x \text{ in } X}(x \cdot c_x) + \Sigma_{y \text{ in } Y}(y \cdot c_y + \text{€}) \quad \text{(Equation 3)}$$

where x,y denote the attacker- and victim-centric features, or predictors, for each user, and X,Y are their respective sets. $c_x, c_y$ are the coefficients that correspond to the x,y features, and € is a constant. Inserting a value for each x,y will derive the group susceptibility score based on their features.

The predictors x,y represent input variables (e.g., a principle of persuasion as determined for an incoming message), while the coefficients $c_x, c_y$ properly weigh the impact of the predictors on the group susceptibility score, and can be derived via logistic regression upon a certain dataset. If $c_x \geq 0$ (similarly for $c_y$), then the feature x increases the value of the susceptibility function, meaning that the user is more susceptible to that predictor. Contrary, if $c_x \leq 0$, then the predictor x decreases susceptibility, meaning that the user is less susceptible to that predictor. The coefficients $c_x$, $c_y$ can be derived analytically or using standard logistic regression tools. Of note, our prediction/warning model may consist of basic arithmetic operations (add/multiply) that are operational in real-time.

In some instances, the susceptibility function on the left of Equation 3 may be isolated to directly get the susceptibility function or score. This may helpful to enable a direct susceptibility function of a user as a function of each predictor.

$$S(X,Y) = [\exp(\Sigma_{x \text{ in } X}(x \cdot c_x) + \Sigma_{y \text{ in } Y}(y \cdot c_y + \text{€}))]/[1 + \exp(\Sigma_{x \text{ in } X}(x \cdot c_x) + \Sigma_{y \text{ in } Y}(y \cdot c_y + \text{€}))] \quad \text{Equation (4)}$$

As noted above, the first step may comprise training a local model, also known as a personal susceptibility function. This model or function may be trained on data collected locally from the user. The personal susceptibility function may not require the dataset of the susceptibility measures. It is noted that in some instances the data upon which the model or function is trained is stored locally for privacy. In other words, the user features are not transferred to third parties. According to another lemma, the logit transformation of personal susceptibility function may be as follows:

$$\text{Logit}(S^{PER}(X',Y')) = \Sigma_{x \text{ in } X}(x \cdot c_x) + \Sigma_{y \text{ in } Y}(y \cdot c_y + \text{€}) \quad \text{Equation (5)}$$

where x',y' denote the attacker- and victim-centric features, or predictors, for the user depicted with a single tone', and X',Y' are their respective sets. $c_{x'}, c_{x'}$ are the coefficients that correspond to the x',y' features, and €) is a constant. Inserting a value for all x,y may derive the personal susceptibility score based on their features.

After generating the two susceptibility models through the above mentioned training phase, the techniques may extract features upon the receipt of a new message, such as an email, direct message, or the like. To begin, user-centric features may be extracted. For instance, demographics features (e.g., age, gender, income, educational level, etc.) can be obtained via a one-time survey taken by the user upon installation of the personalized-warning component, periodically, or the like, with responses kept local at the user machine or browser for privacy. Additionally, or alternatively, cognitive and socio-emotional measures can also be obtained via self-administration of assessment instruments in electronic format. For example, a tool might collect the cognition and socio-emotional measures daily to investigate the impact of short-term cognitive (e.g., the quality of sleep might affect short-term cognition) or socio-emotional (e.g., a personal event might change mood) changes on susceptibility. For features that change quickly, a tool might attempt to investigate more efficient and transparent means (e.g., to measure stress levels based on touching pressure, cursor or typing speed, etc.). In this regard, it is to be appreciated that the personalized-warning component may be configured to work with a spectrum of features either collected as a one-time questionnaire/assessment, periodically, or continuously.

In addition, attacker-centric features may be extracted from the incoming email. For example, the techniques may identify these features, such as principle-of-persuasion features, from each incoming email. In some instances, the techniques may utilize natural-language-processing (NLP) techniques to generate text associated with each message and determine whether one or more predefined keywords associated with these attacker-centric features are represented in the text.

After identifying both user-centric and attacker-centric features, the techniques may input these features into both the group function and the personal function (i.e., the global model and the local model, respectively). Each function may output a score indicative of how susceptible the group (represented by the group function) or the individual (represented by the personal function) are to interacting with the message and a degree of likelihood that the message is malicious. The next step may comprise integrating these two susceptibility scores to derive an Integrated Susceptibility Score (ISS), ∈[0,1]. Next, the techniques may compare this ISS a predefined and configuration threshold and, if the ISS is higher, the personalized-warning component may generate a user-friendly warning informing the user about the group, personalized, and integrated susceptibility scores. In some instances, the techniques may integrate these two susceptibility scores using an arithmetic mean, a harmonic mean (e.g., the complementary harmonic mean of the complementary scores), a maximum value of the two scores, a minimum value of the two scores, and/or any other type of integrated score.

The techniques introduced above are now described with reference to example architectures below. It is to be appreciated that the following description provides several examples, and that the techniques may apply equally to other non-illustrated environments and architectures.

Figure 1:
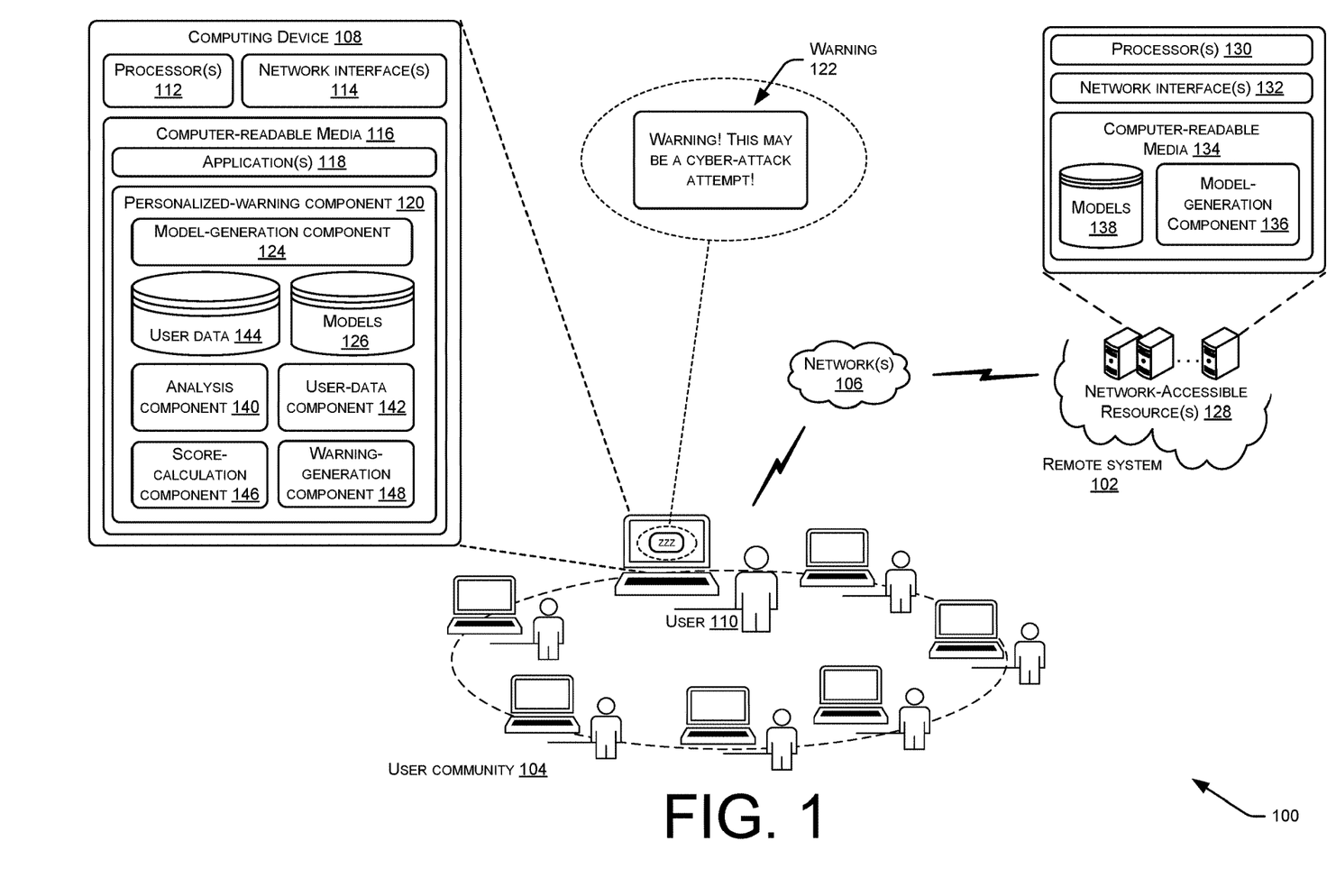
FIG. 1 illustrates a system-architecture diagram of an example environment in which a user device stores a personalized-warning configured to train a model based on interactions between a user of the device and one or more applications stored on the device, such as an email or other communication application. When the communication application receives an incoming message, this component may analyze the message to determine whether it contains any cues indicative of deception/influence, as well as information regarding the user associated with the device. The component may then input this information into the model associated with the user, and potentially one or more global models, such that the model(s) outputs a score indicating whether to warn the user regarding the message. Thus, this component determines, in real-time, whether to output a security warning regarding an incoming communication based on characteristics of the communication and characteristics of the user receiving the communication.

FIG. 1 illustrates a system-architecture diagram of an example environment 100 in which a user device stores a personalized-warning configured to train a model based on interactions between a user of the device and one or more applications stored on the device, such as an email or other communication application. When the communication application receives an incoming message, this component may analyze the message to determine whether it contains any cues indicative of a cyber-attack, as well as information regarding the user associated with the device. The component may then input this information into the model associated with the user, and potentially one or more global models, such that the model(s) outputs a score indicating whether to warn the user regarding the message. Thus, this component determines, in real-time, whether to output a security warning regarding an incoming communication based on characteristics of the communication and characteristics of the user receiving the communication.

As illustrated, the example environment includes a remote system that communicatively couples to devices of a user community 104 over a network 106. The user community 104 may generally represent any collection of users whose devices may utilize the described techniques and/or whose interactions may be used to train one or more models.

FIG. 1 further illustrates an example computing device 108 operated by an example user 110 of the user community 104. As will be appreciated, each user in the user community may be associated with one or more computing devices (or multiple users may be associated with a single computing device) that is configured similar to the computing device 108. As illustrated, the computing device 108 may include one or more hardware processors 112, one or more network interfaces, and computer-readable media 116, which may store computer-readable instructions executable by the processors 112.

The computer-readable media 116 may store or otherwise have access to one or more applications 118, as well as a personalized-warning computing 120. In some instances, the applications 118 may comprise a local or web-based email or other message application, while the personalized-warning component 120 may be configured to selectively determine when to output warning messages to the user 110 in response to incoming messages received at the email or other messaging application. For instance, FIG. 1 illustrates that the personalized-warning component 120 may generate and output a warning 122 ("Warning! This may be a cyber-attack attempt!) in response to receiving an incoming email using the techniques described below. In some instances, the applications 118 may also include other applications whose interactions with the user 110 may be used to train a model associated with the user 110, as described below.

FIG. 1 further illustrates that the personalized-warning component 120 may include a model-generation component 124 that is configured to generate one or more models. For instance, the model-generation component 124 executing the local computing device 108 of the user may be configured to store interactions between the user 110 and one or more of the applications to generate a local, personalized model associated with the user 110. For example, the model-generation component 124 may analyze interactions between the user 110 and emails or other messages associated with a messaging application to determine one or more topics that the user 110 may be susceptible as it pertains to phishing messages or other types of potential cyber-attacks. For instance, the model-generation component 124 may analyze interactions such as the types of emails the user opens, the types of emails the user responds to, the types of links the user clicks on, the types of attachments the user opens, the types of email the user deletes, and/or the like to train the local model 126 associated with the personalized susceptibilities of the user 110.

In addition, or in the alternative, the model-generation component 124 may analyze interactions between the user 110 and one or more other applications 118, such as a web browser, gaming applications, or the like. For example, the model-generation component may analyze the types of topics the user 110 often researches or reads about, the types of content the user typically consumes, and/or the like to help train the local model 126 associated with the user 110.

For example, a model trained for the example user 110 may indicate that he or she may be particularly susceptible to phishing emails related to (alleged) animal abuse, while another user may instead be susceptible to phishing emails that threaten legal action or promise a large (and fictitious) rewards.

In addition, to the model-generation component 124 training the local model(s) 126, the remote system 102 may train one or more models on user-group bases. For instance, and as illustrated, the remote system 102 may comprise one or more network-accessible resources 128, such as server computing devices accessible to the client computing devices over the network 106. The network-accessible resources 128 may comprise one or more hardware processors 130, one or more network interfaces 132, and computer-readable media 134. The computer-readable media 134 may store computer-readable instructions executable by the processors 130 and may store or otherwise have access to a model-generation component 136. The model-generation component 136 may be configured to analyze interactions between applications and users of the user community to generate one or more group models 138.

As described above, the group models 138 may be indicative of the interactions of users of the user community 104 that are associated with different demographic characteristics. For instance, the models 138 may include a first model trained using interactions associated with users of a first demographic, a second model trained using interactions associated with users of a second demographic, and so forth. As noted above, the demographs may be created based on any number of one or more factors, such as age, gender, location, income level, education level, and/or the like. Further, each of the models 138 may be indicative of susceptibilities of users of these particular demographic groups. For instance, a particular model may indicate which topics users of that particular demographic may be particularly susceptible to as it pertains to phishing emails or other types of cyber-attacks.

Returning to the computing device 108, the personalized-warning component 120 may receive, from the model-generation component 136 executing on the remote system 102, one or more of the models 138 corresponding to a demographic group of the example user 110. For instance, the remote system may send, to the personalized-warning component 120, a group model that is associated with, and has been trained using interactions of, users that belong to same demographic group as the user 110. The personalized-warning component 120 may store the received group model with the models 126, such that the models 126 include a local, personalized model and a group model representative of users of the demographic group to which the user 110 belongs.

As illustrated, the personalized-warning component 120 may further store a user-data component 142, which may be configured to generate feature data indicative of one or more characteristics of the user 110. Upon generating this data, the user-data component 142 may store this as user data 144. These characteristics may include user mood, recent sleep quality, and cognitive and socio-emotional status. In some instances, this user data 144 may be determined based on a one-time or periodic survey or questionnaire provided to the user 110, such as a survey provided to the user each morning that he or she opens up his or her messaging application. In other examples, the data 144 may be determined based on a game, quiz, or the like, which could be provided to the user on a daily, weekly, or other periodic basis. In addition, or in the alternative, this user data 144 may be deduced based on interactions between the user 110 and the application(s) 118 and/or between the user and input devices associated with the computing device 108. For example, the user data 144 may be determined based on whether the user is currently responding to and/or reading emails, a reading speed of the user, how fast the user is moving his or her cursor, how fast the user is typing, and/or the like. In addition, the user data 144 may comprise some or all of the demographic data described above, such as age, gender, income level, educational level, and/or the like.

Upon receiving an incoming message, such as an email, the personalized-warning component 120 may make a determination regarding whether to generate and output a warning (e.g., the warning 122) to the user 110 based on both the contents of the email and information associated with the user 110. That is, rather than simply make this determination based on characteristics of the email alone, the personalized-warning component 120 may take this into account as well as particular susceptibilities of the user 110 that is receiving the email.

To begin, an analysis component 140 of the personalized-warning component 120 may analyze the received message to determine whether the message includes any deceptive cues. That is, the analysis component 140 may analyze contents of the message to identify features indicative of the message being a potentially malicious message. For example, the analysis component 140 may perform natural-language-processing (NLP) techniques on the message to identify text of the message, and may analyze this text to determine whether it includes any predefined keywords that are associated with known deceptive cues, such as those deceptive cues described above.

After generating the user data 144 and the feature data associated with the incoming message, this data may be input to both the personalized model associated with the user 110 and the group model associated with the user 110 belongs. In some instances, the user may be assigned to a group based on characteristics associated with the user, such as demographic characteristics (e.g., age, gender, location, etc.), socio-emotional functioning of the user (e.g., based on surveys, quizzes, etc.), and/or the like. These models may be configured to each output a respective score indicative of whether the user 110 is likely to be susceptible to this message, regardless of whether this message is malicious. For instance, the personalized model may output a score indicating a susceptibility of the individual user 110 to this particular message, while the group model may output a score indicating a susceptibility of the demographic group to this particular message. In some instances, each score may be normalized between zero and one, with one representing no susceptibility and one representing extreme susceptibility. Furthermore, these models may represent machine learning models (e.g., convolutional neural networks (CNN) or Random Forest) trained to output these indications. That is, while one example of regression learning has been provided above, it is to be appreciated that any one or more classification algorithms may be used to output the described indications.

After the models output these respective scores, each score may be input to a score-calculation component 146, which may use both scores to generate a third, integrated score. In some instances, the score-calculation component 146 may be configured to generate the third score as an arithmetic mean of the first and second scores, a harmonic mean of the first and second scores, a maximum or minimum of the first and second scores, and/or the like. The score-calculation component 146 may then provide an indication of this score to a warning-generation component 148.

The warning-generation component 148 may be configured to compare the third score to a predefined, configured threshold to determine whether to output a warning, such as the example warning 122. For instance, if the third score is greater than the threshold, then the warning-generation component 148 may generate and output a warning, while the component 148 may refrain from doing so if the third score is less than the threshold. It is to be appreciated that the threshold may be configurable by the user 110 in some instances, so as to make the warning-generation component 148 more or less likely to output a warning. Further, while the warning is illustrated as a visual warning, it is to be appreciated that the warning may additionally, or alternatively, be audible in some instances.

Figure 2A:
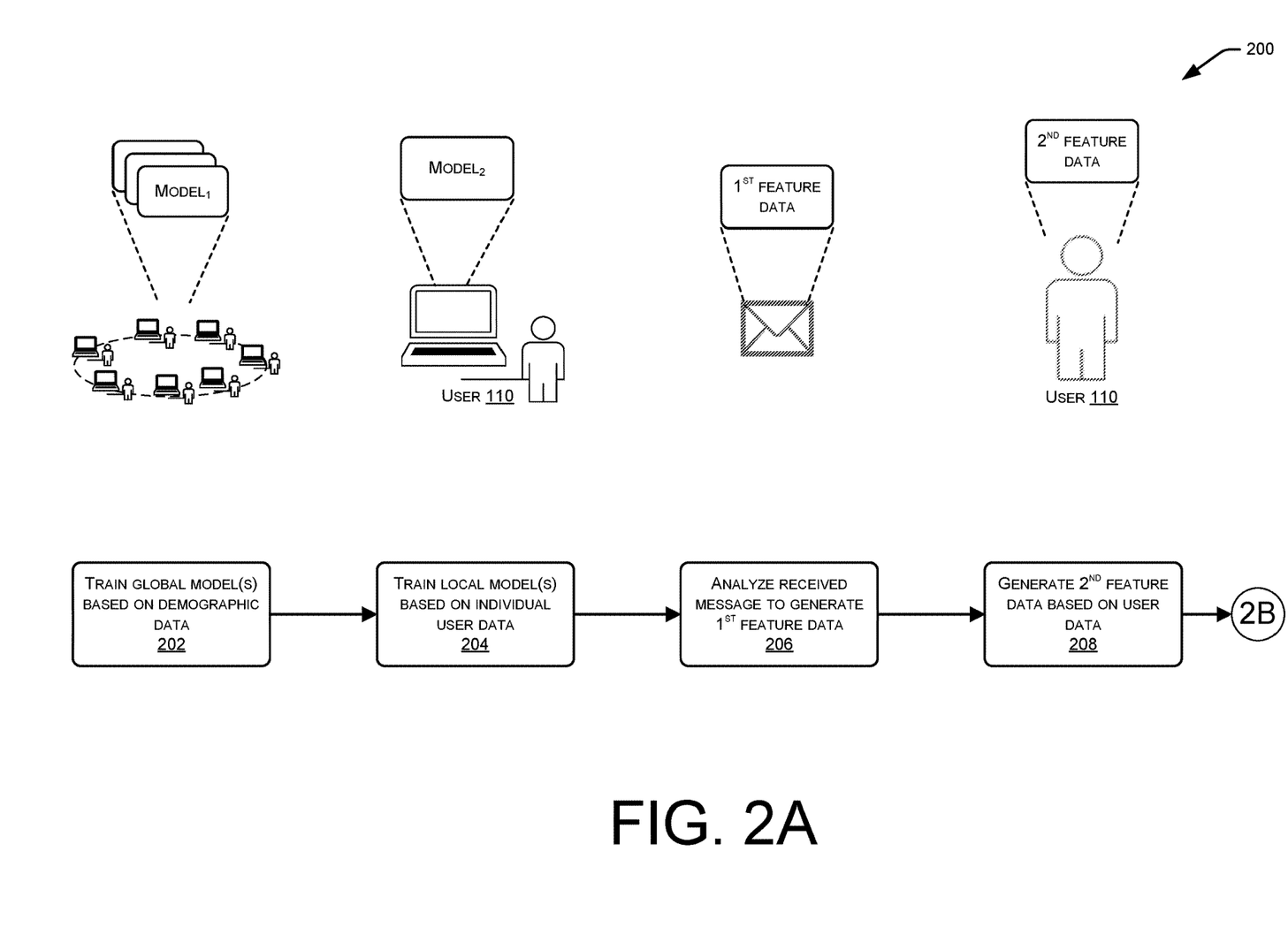
FIGS. 2A-B collectively illustrate a sequence of operations for training one or more models associated with a user, receiving an incoming message, analyzing the message and one or more characteristics of the user, inputting this information to the one or more models, and receiving, as output of the models, data for determining whether to output a warning regarding the communication to the user.
Figure 2B:
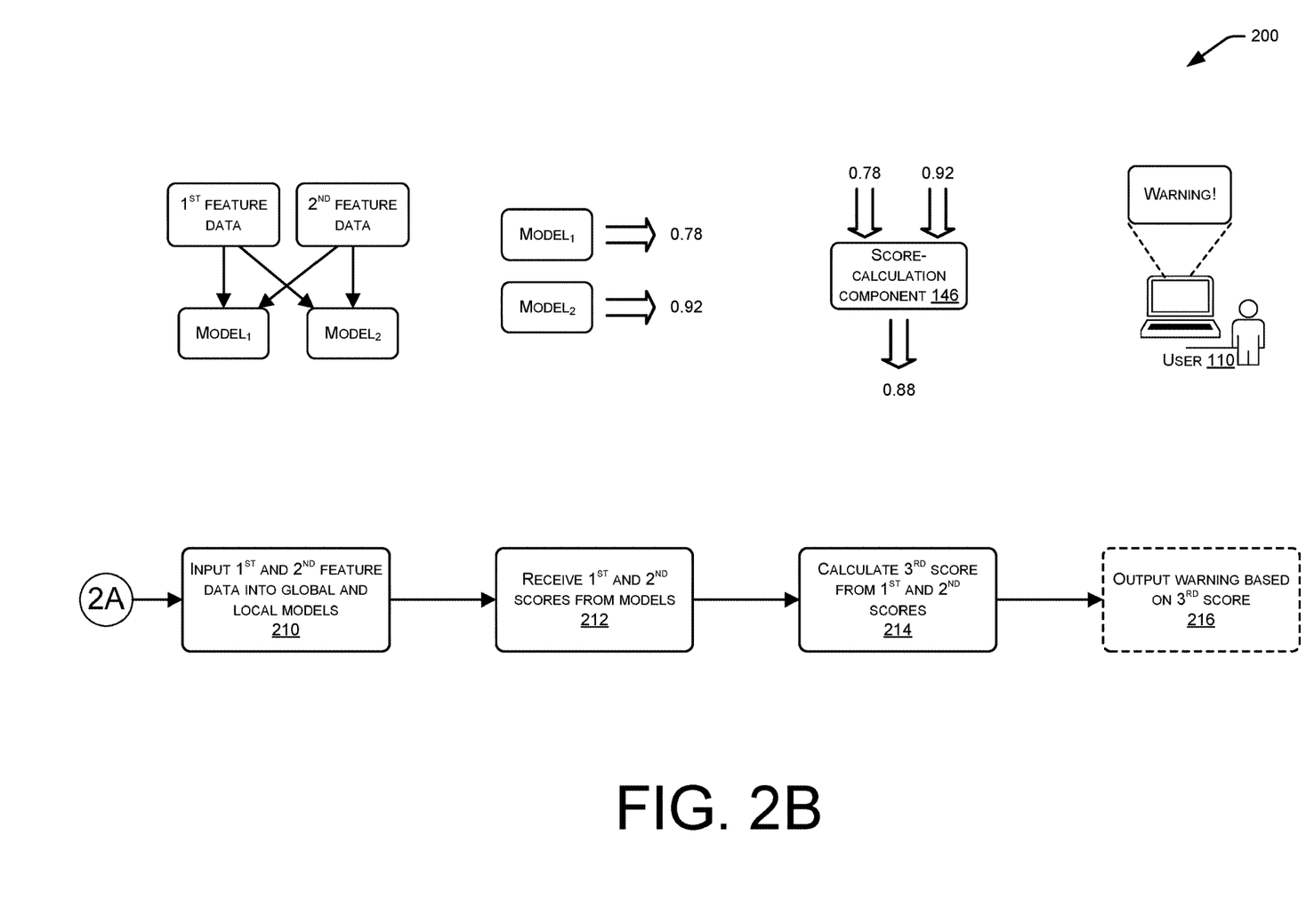

FIGS. 2A-B collectively illustrate a sequence of operations 200 for training one or more models associated with a user, receiving an incoming message, analyzing the message and one or more characteristics of the user, inputting this information to the one or more models, and receiving, as output of the models, data for determining whether to output a warning regarding the communication to the user.

At an operation 202, one or more global models may be trained for respective demographic groups based on data associated with these demographic groups. For instance, the model-generation component 136 of the remote system 102 may generate at least one global model for each of multiple groups, with these groups determined based on demographic factors (such as age, income level, education level, location, and/or the like), social-emotional functional, and/or the like. In some instances, the model-generation component 136 trains these global models based on interactions between users of each respective group and a messaging application and/or other applications operated by these users.

An operation 204 represents training one or more local models based on individual user data. For instance, the model-generation component 124 of the computing device 108 may analyze interactions between the user 110 and one or more applications 118 stored on the device 108, such as an email or other messaging application. In some instances, the generated local model may be indicative of topics that the user 110 may be susceptible to as it pertains to phishing email and/or other types of cyber-attacks.

An operation 206 represents analyzing a received message to generate first feature data. For instance, the analysis component 140 of the computing device 108 may perform NLP techniques to identify text of the message and may analyze this text to determine whether it contains one or more predefined keywords that have been previously correlated with phishing attempts or other types of social-engineering attacks (e.g., misinformation). In some instances, the analysis component 140 may also generate the first feature data based on other features of the message, such as time at which it was received, a distribution list to which it was sent, an address from which it was sent, and/or the like.

An operation 208 represents generating second feature data based on data associated with an individual user, such as the user 110. For example, the user-data component 142 may generate user data 144 based on a survey taken by the user, a questionnaire taken by the user, interactions between the user and one or more applications 118, interactions between the user and one or more input devices of the computing device 108, and/or the like. This user-data component 142 may also generate the user data 144 based on demographic or other data associated with the user 110, such as an age, cognitive and socio-emotional status associated with the user 110.

FIG. 2B continues the illustration of the sequence of operations 200 and includes, at an operation 210, inputting the first feature data and the second feature data into each of the global model(s) and the local model(s). For instance, the personalized-warning component 122 may input the first feature data and the second feature data into the local, personalized model for receiving first data indicative of the level of susceptibility the user 110 may have to this email, in some instances without regard to whether the email is likely malicious or not, given that this may be difficult to determine. In addition, the personalized-warning component 122 may input the first feature data and the second feature data into the global model for receiving second data indicative of the level of susceptibility that an average user of the group for the which the model has been trained would be susceptible to this email.

An operation 212 represents receiving, from each model, a respective score. For instance, this operation represents receiving a first score from the local model and a second score from the second model. As described above, the first score may be indicative of the level of susceptibility the user 110 may have to this email, while the second score may be indicative of the level of susceptibility that an average user of the demograph for the which the model has been trained would be susceptible to this email. In the illustrated example, for instance, FIG. 2 illustrates that the global model outputs a score of 0.78, while the local model outputs a score of 0.92. In this example, the models indicate that the user 110 is even more susceptible to the received message than the average user associated with his or her demograph.

Next, an operation 214 represents calculating a third score based on the first and second scores. For instance, the score-calculation component 146 of the computing device 108 may generate the third score as an arithmetic mean of the first and second scores, a harmonic mean of the first and second scores, a maximum of the first and second scores, and/or the like. In this example, the score-calculation component 146 outputs a third, integrated score of 0.88.

Finally, an operation 216 represents outputting a warning to the user 110 based on the third score. For instance, the personalized-warning component 122 may compare the third score to a threshold score and, if the score is greater than the threshold, may cause the warning-generation component 148 to output a warning to the user 110.

Figure 3A:
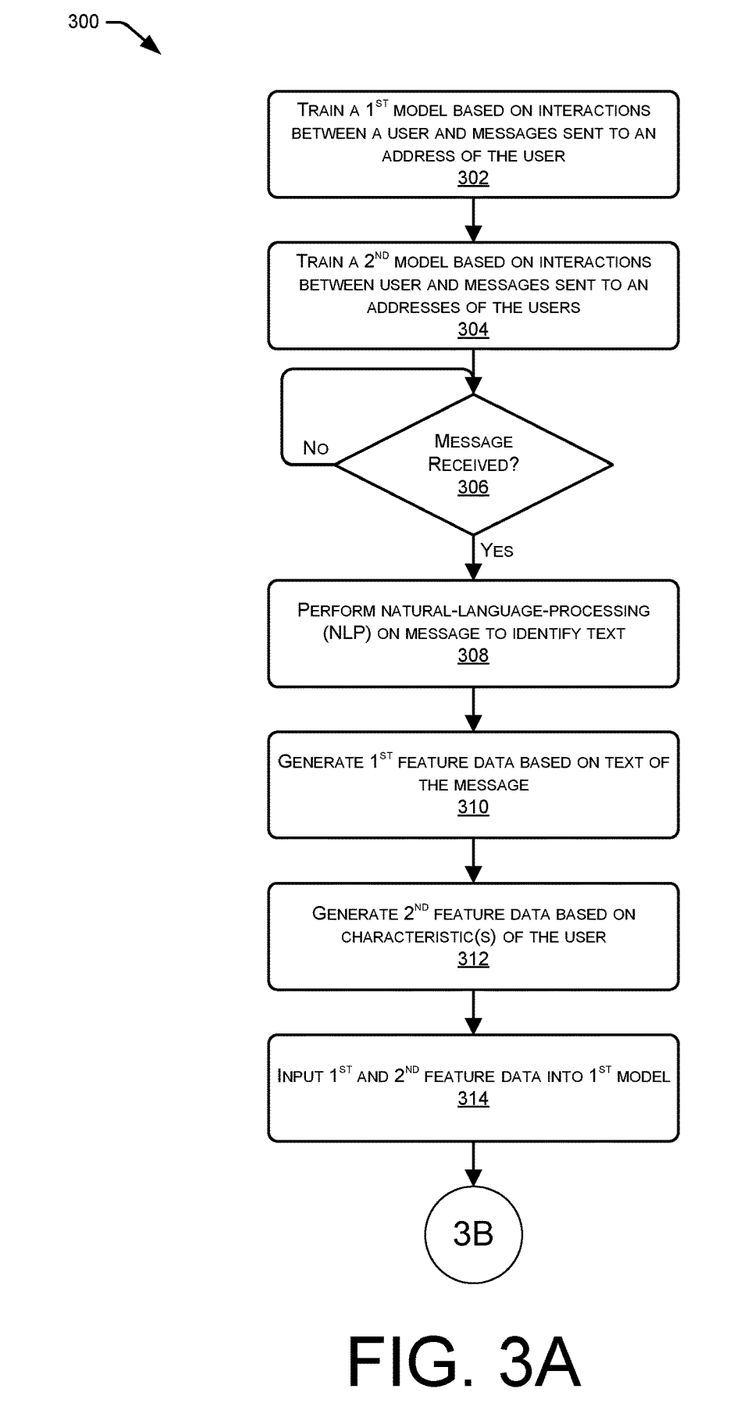
FIGS. 3A-B collectively illustrate a flow diagram of an example process for determining whether to output a warning to a user based on characteristics of an incoming message and characteristics of a user receiving the communication.
Figure 3B:
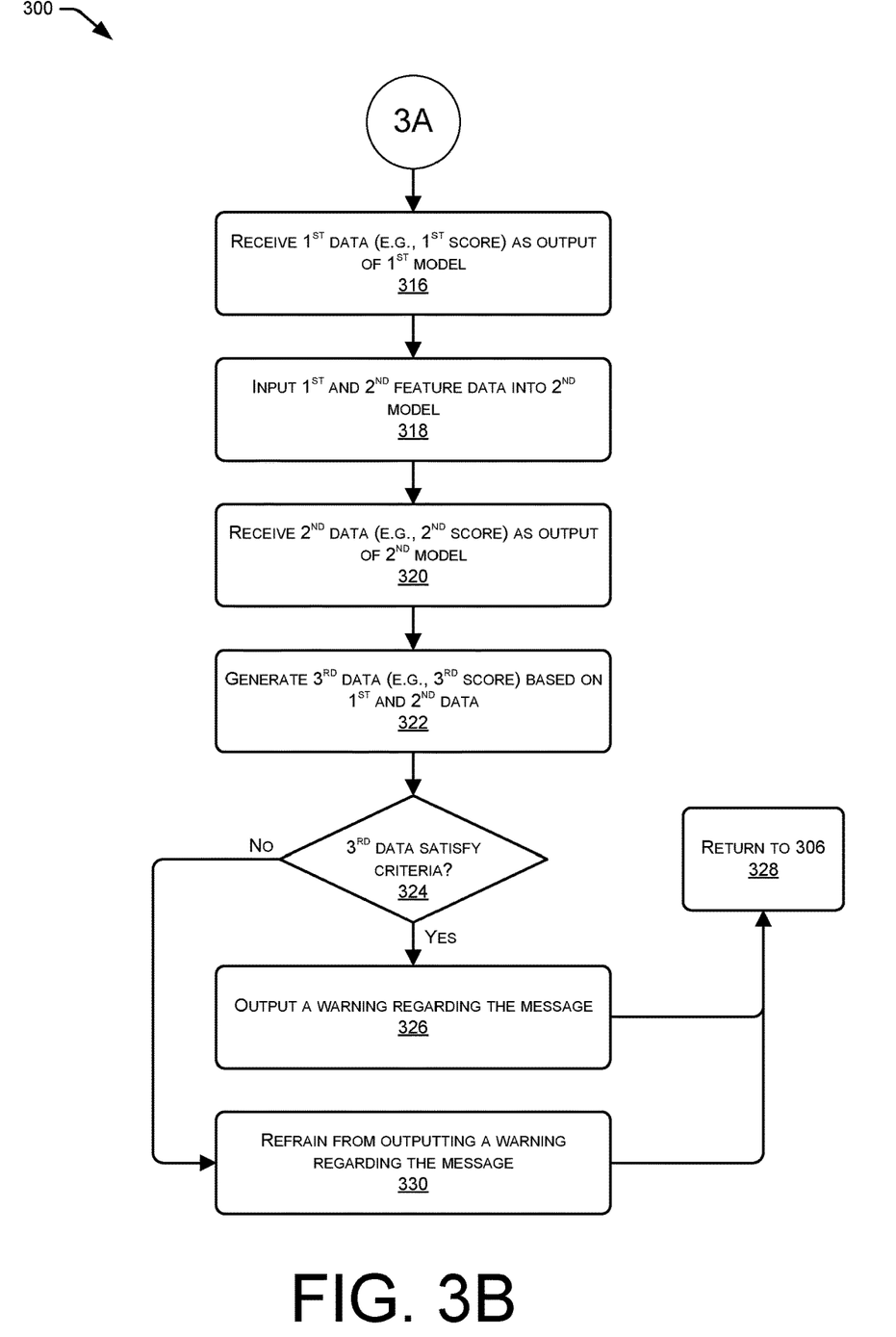

FIGS. 3A-B collectively illustrate a flow diagram of an example process 300 for determining whether to output a warning to a user based on characteristics of an incoming message and characteristics of a user receiving the communication.

An operation 302 represents training a first model based at least in part on interactions between the first user and electronic messages sent to the first address associated with the first user. For instance, the model-generation component 124 stored on the computing device 108 may train a model based on interactions between the user 110 and an email application and/or other applications operated by the user 110.

An operation 304 represents training a second model based at least in part on interactions between one or more additional users and respective addresses associated with the one or more additional users, wherein the one or more additional users are associated with the one or more demographic characteristics. For instance, the model-generation component 136 of the remote system 102 may train one or more global models, each associated with a group of users defined by one or more demographic criteria, social-emotional criteria, and/or other types of criteria that may be used to identify similar users.

Next, an operation 306 represents determining whether a message has been received. If not, then the process 300 continues to await reception of a message. If a message is received, then the process 300 proceeds to an operation 308, which represents performing natural-language-processing (NLP) on the first electronic message to identify text of the first electronic message. An operation 310 then represents generating first feature data based at least in part on the text of the first electronic message. For instance, the analysis component 140 may perform the NLP techniques and the analysis to generate any of the attacker-centric predictors described above.

An operation 312 represents generating second feature data based at least in part on one or more characteristics of the first user. For instance, the user-data component 142 may analyze data associated with the first user to generate the second feature data. In some instances, the user-data component 142 may perform this analysis to generate any of the victim-centric predictors described above. Further, in some instances the second feature data may be calculated offline and prior to receiving the current email. For instance, the second feature data may be generated based on known information of the user (e.g., demographic data associated with the user), social-emotional functioning of the user (e.g., as determined via surveys, cursor speeds, etc.), and/or any other type of data. Next, an operation 314 represents inputting the first and second feature data into the first model.

FIG. 3B continues the illustration of the process 300 and includes, at an operation 316, receiving, as output of the first model, first data indicating whether to output, to the first user, a warning regarding the first electronic message. In some instances, the first data may comprise a first score.

An operation 318, meanwhile, represents inputting the first and second feature data into the second model, while an operation 320 represents receiving, as output of the second model, second data indicating whether to output, to the first user, a warning regarding the first electronic message. In some instances, the second data comprises a second score.

An operation 322 represents generating third data (e.g., a third score) based at least in part on the first data and the second data. For instance, the score-calculation component 146 may generate this third score as arithmetic mean, harmonic mean, maximum value, or the like.

An operation 324 represents determining whether the third data satisfies one or more criteria for outputting a warning regarding the first electronic message. For instance, the warning-generation component 148 may compare the third score to a predefined threshold value. If the third data satisfies the one or more criteria, then at an operation 326 the warning-generation component 148 may output, to the first user, a warning regarding the first electronic message. The process 300 may then return to operation 306 at an operation 328. If, however, the third data does not meet the one or more criteria, then at an operation 330 the warning-generation component 148 refrains from outputting the warning and, thereafter, the process returns to the operation 306.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 2A-3B, and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 4:
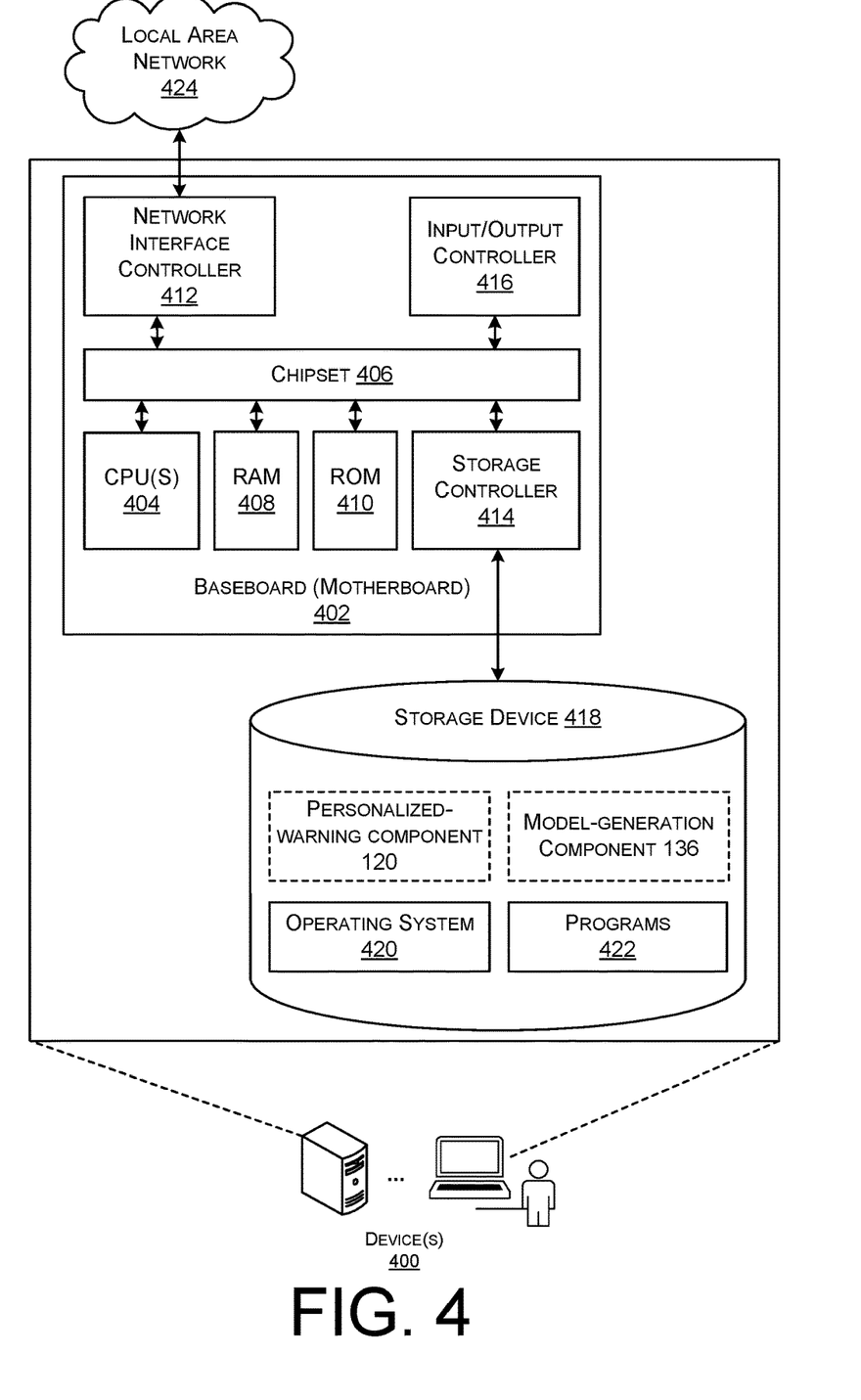
FIG. 4 is a computer architecture diagram showing an illustrative computer hardware architecture for implementing computing devices configured to implement the techniques described herein. The user devices and/or the server devices shown in FIG. 1 may include some or all of the components illustrated in and described with reference to FIG. 4.

FIG. 4 is a computer architecture diagram showing an illustrative computer hardware architecture for implementing a device 400 that can be utilized to implement aspects of the various technologies presented herein. For instance, the computing device 108 and/or the network-accessible devices 128 may each include some or all of the components discussed below with reference to the device 400.

In some instances, the network-accessible devices can comprise the computing resources provided by a cloud computing network, data center, or the like can be data processing resources such as VM instances or hardware computing systems, database clusters, computing clusters, storage clusters, data storage resources, database resources, networking resources, and others. Some of the devices 400 can also be configured to execute a resource manager capable of instantiating and/or managing the computing resources. In the case of VM instances, for example, the resource manager can be a hypervisor or another type of program configured to enable the execution of multiple VM instances on a single server device 400. Devices 400 in a data center can also be configured to provide network services and other types of services.

The device 400 includes a baseboard 402, or "motherboard," which is a printed circuit board to which a multitude of components or devices can be connected by way of a system bus or other electrical communication paths. In one illustrative configuration, one or more central processing units (CPUs) 404 operate in conjunction with a chipset 406. The CPUs 404 can be standard programmable processors that perform arithmetic and logical operations necessary for the operation of the device 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the device 400. The chipset 406 can further provide an interface to a computer-readable storage medium such as a read-only memory (ROM) 410 or non-volatile RAM (NVRAM) for storing basic routines that help to startup the device 400 and to transfer information between the various components and devices. The ROM 410 or NVRAM can also store other software components necessary for the operation of the device 400 in accordance with the configurations described herein.

The device 400 can operate in a networked environment using logical connections to remote computing devices and computer systems through a network, such as a local area network 424. The chipset 406 can include functionality for providing network connectivity through a Network Interface Card (NIC) 412, such as a gigabit Ethernet adapter. The NIC 412 is capable of connecting the device 400 to other computing devices over the network. It should be appreciated that multiple NICs 412 can be present in the device 400, connecting the computer to other types of networks and remote computer systems.

The device 400 can be connected to a storage device 418 that provides non-volatile storage for the computer. The storage device 418 can store an operating system 420, programs 422, and data, which have been described in greater detail herein. The storage device 418 can be connected to the device 400 through a storage controller 414 connected to the chipset 406. The storage device 418 can consist of one or more physical storage units. The storage controller 414 can interface with the physical storage units through a serial attached SCSI (SAS) interface, a serial advanced technology attachment (SATA) interface, an FC interface, or other type of interface for physically connecting and transferring data between computers and physical storage units.

The device 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the device 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The device 400 can further read information from the storage device 418 by detecting the physical states or characteristics of one or more particular locations within the physical storage units.

In addition to the mass storage device 418 described above, the device 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 400.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the device 400. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 418 can store other system or application programs and data utilized by the device 400.

In one embodiment, the storage device 418 or other computer-readable storage media is encoded with computer-executable instructions which, when loaded into the device 400, transform the computer from a general-purpose computing system into a special-purpose computer capable of implementing the embodiments described herein. These computer-executable instructions transform the device 400 by specifying how the CPUs 404 transition between states, as described above. According to one embodiment, the device 400 has access to computer-readable storage media storing computer-executable instructions which, when executed by the device 400, perform the various processes described above with regard to FIGS. 2A-3D. The device 400 can also include computer-readable storage media having instructions stored thereupon for performing any of the other computer-implemented operations described herein.

The device 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the device 400 might not include all of the components shown in FIG. 5, can include other components that are not explicitly shown in FIG. 5, or might utilize an architecture completely different than that shown in FIG. 5.

The device 400 may also store, in the storage device 418, the personalized-warning component 120 and each of its subcomponents (e.g., in the case of computing device 108) or the model-generation component 136 (e.g., in the case of the network-accessible resources 128). These components may be used to perform some or all of the techniques described above with reference to FIGS. 1-3B.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. One or more computing devices comprising:
   one or more processors; and
   one or more computer-readable media storing computer-executable instructions that, when executed, cause the one or more processors to perform acts comprising:
   training at least one model based at least in part on interactions between one or more users and electronic messages sent to addresses associated with the one or more users, the at least one model being trained to output susceptibility scores indicating likelihoods that the one or more users are to fall victim to malicious electronic messages;
   receiving a first electronic message sent to a first address associated with a first user;
   performing natural-language-processing (NLP) analysis on the first electronic message to identify text of the first electronic message;
   generating first feature data based at least in part on the text obtained from the NLP analysis of the first electronic message;
   generating second feature data based at least in part on one or more characteristics of the first user;
   inputting, to the at least one model, the first feature data and the second feature data;
   receiving a plurality of susceptibility scores comprising:
      receiving, as output of the at least one model, a first susceptibility score indicating a likelihood that the first user is to fall victim to malicious data included in the first electronic message based at least in part on past behavior of the first user; and
      receiving a second susceptibility score indicating a likelihood that the first user is to fall victim to malicious data included in the first electronic message based at least in part on past behaviors of a group of users with which the first user is associated; and
   outputting, to the first user, a warning regarding the first electronic message based at least in part on the first susceptibility score and the second susceptibility score.

2. The one or more computing devices as recited in claim 1, wherein:
   the first user is associated with one or more demographic characteristics; and
   the training the at least one model comprises:
      training a first model based at least in part on interactions between the first user and electronic messages sent to the first address associated with the first user; and
      training a second model based at least in part on interactions between one or more additional users and respective addresses associated with the one or more additional users, wherein the one or more additional users are associated with the one or more demographic characteristics.

3. The one or more computing devices as recited in claim 2, wherein:
   the inputting comprises:
      inputting, into the first model, the first feature data and the second feature data; and
      inputting, into the second model, the first feature data and the second feature data; and
   the receiving the second susceptibility score comprises:
      receiving, as output of the second model, a second susceptibility score indicating a likelihood that the first user is to fall victim to malicious data included in the first electronic message.

4. The one or more computing devices as recited in claim 3, the acts further comprising:
generating a third susceptibility score based at least in part on the first susceptibility score and the second susceptibility score;
determining that the third susceptibility score satisfies one or more criteria for outputting the warning regarding the first electronic message; and
outputting, to the first user, the warning regarding the first electronic message.

5. The one or more computing devices as recited in claim 1, wherein the second feature data indicates a level of vulnerability of the first user to the first electronic message, wherein the level of vulnerability is based at least in part on the one or more characteristics of the first user.

6. The one or more computing devices as recited in claim 1, wherein the first feature data indicates whether the first electronic message includes one or more keywords associated with one or more deceptive cues.

7. A method comprising:
training at least one model based at least in part on interactions between one or more users and electronic messages sent to addresses associated with the one or more users, the at least one model being trained to output susceptibility scores indicating likelihoods that the one or more users are to fall victim to malicious electronic messages;
receiving a first electronic message sent to a first address associated with a first user;
analyzing the first electronic message to generate first feature data based at least in part on text obtained from a natural-language-processing (NLP) analysis of the first electronic message;
determining one or more characteristics of the first user to generate second feature data;
inputting, to the at least one model, the first feature data and the second feature data;
receiving a plurality of susceptibility scores comprising:
receiving, as output of the at least one model, a first susceptibility score indicating a likelihood that the first user is to fall victim to malicious data included in the first electronic message based at least in part on past behavior of the first user; and
receiving a second susceptibility score indicating a likelihood that the first user is to fall victim to malicious data included in the first electronic message based at least in part on past behaviors of a group of users with which the first user is associated; and
outputting, to the first user, a warning regarding the first electronic message based at least in part on the first susceptibility score and the second susceptibility score.

8. The method as recited in claim 7, wherein the NLP analysis on the first electronic message identifies text of the first electronic message and analyzes the text of the first electronic message to generate the first feature data.

9. The method as recited in claim 7, wherein the first feature data indicates whether the first electronic message includes one or more keywords associated with one or more deceptive cues.

10. The method as recited in claim 7, wherein:
the first user is associated with one or more demographic characteristics; and
the training the at least one model comprises:
training a first model based at least in part on interactions between the first user and electronic messages sent to the first address associated with the first user; and
training a second model based at least in part on interactions between one or more additional users and respective addresses associated with the one or more additional users, wherein the one or more additional users are associated with the one or more demographic characteristics.

11. The method as recited in claim 10, wherein:
the inputting comprises:
inputting, into the first model, the first feature data and the second feature data; and
inputting, into the second model, the first feature data and the second feature data; and
the receiving the second susceptibility score comprises
receiving, as output of the second model, a second susceptibility score indicating a likelihood that the first user is to fall victim to malicious data included in the first electronic message.

12. The method as recited in claim 11, further comprising:
generating a third susceptibility score based at least in part on the first susceptibility score and the second susceptibility score;
determining that the third susceptibility score satisfies one or more criteria for outputting the warning regarding the first electronic message; and
outputting, to the first user, the warning regarding the first electronic message.

13. The method as recited in claim 7, wherein the second feature data indicates a level of vulnerability of the first user to the first electronic message, wherein the level of vulnerability is based at least in part on the one or more characteristics.

14. One or more computer-readable media storing computer-executable instructions that, when executed, cause one or more processors to perform acts comprising:
training at least one model based at least in part on interactions between one or more users and electronic messages sent to addresses associated with the one or more users, the at least one model being trained to output susceptibility scores indicating likelihoods that the one or more users are to fall victim to malicious electronic messages;
receiving a first electronic message sent to a first address associated with a first user;
analyzing the first electronic message to generate first feature data based at least in part on text obtained from a natural-language-processing (NLP) analysis of the first electronic message;
determining one or more characteristics of the first user to generate second feature data;
inputting, to the at least one model, the first feature data and the second feature data;
receiving a plurality of susceptibility scores comprising:
receiving, as output of the at least one model, a first susceptibility score indicating a likelihood that the first user is to fall victim to malicious data included in the first electronic message based at least in part on past behavior of the first user; and
receiving a second susceptibility score indicating a likelihood that the first user is to fall victim to malicious data included in the first electronic message based at least in part on past behaviors of a group of users with which the first user is associated; and outputting, to the first user, a warning regarding the first electronic message based at least in part on the first susceptibility score and the second susceptibility score.

15. The one or more computer-readable media as recited in claim 14, wherein the NLP analysis on the first electronic message identifies text of the first electronic message and analyzes the text of the first electronic message to generate the first feature data.

16. The one or more computer-readable media as recited in claim 14, wherein the first feature data indicates whether the first electronic message includes one or more keywords associated with one or more deceptive cues.

17. The one or more computer-readable media as recited in claim 14, wherein:
the first user is associated with one or more demographic characteristics; and
the training the at least one model comprises:
training a first model based at least in part on interactions between the first user and electronic messages sent to the first address associated with the first user; and
training a second model based at least in part on interactions between one or more additional users and respective addresses associated with the one or more additional users, wherein the one or more additional users are associated with the one or more demographic characteristics.

18. The one or more computer-readable media as recited in claim 17 wherein:
the inputting comprises:
inputting, into the first model, the first feature data and the second feature data; and
inputting, into the second model, the first feature data and the second feature data; and
the receiving the second susceptibility score comprises
receiving, as output of the second model, a second susceptibility score indicating a likelihood that the first user is to fall victim to malicious data included in the first electronic message.

19. The one or more computer-readable media as recited in claim 18, the acts further comprising:
generating a third susceptibility score based at least in part on the first susceptibility score and the second susceptibility score;
determining that the third susceptibility score satisfies one or more criteria for outputting the warning regarding the first electronic message; and
outputting, to the first user, the warning regarding the first electronic message.

20. The one or more computer-readable media as recited in claim 14, wherein the second feature data indicates a level of vulnerability of the first user to the first electronic message, wherein the level of vulnerability is based at least in part on the one or more characteristics.

* * * * *